(12) United States Patent
Saito et al.

(10) Patent No.: US 11,435,282 B2
(45) Date of Patent: Sep. 6, 2022

(54) GAS ANALYSIS DEVICE

(71) Applicant: KABUSHIKI KAISHA TOSHIBA, Tokyo (JP)

(72) Inventors: Shinji Saito, Yokohama (JP); Tsutomu Kakuno, Fujisawa (JP); Rei Hashimoto, Edogawa (JP); Kei Kaneko, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/245,703

(22) Filed: Apr. 30, 2021

(65) Prior Publication Data
US 2022/0057319 A1   Feb. 24, 2022

(30) Foreign Application Priority Data

Aug. 19, 2020   (JP) .............................. JP2020-138661

(51) Int. Cl.
| | | |
|---|---|---|
| *G01N 21/00* | (2006.01) | |
| *G01N 21/03* | (2006.01) | |
| *G01N 21/27* | (2006.01) | |
| *G01N 21/39* | (2006.01) | |

(52) U.S. Cl.
CPC ....... *G01N 21/0303* (2013.01); *G01N 21/276* (2013.01); *G01N 21/39* (2013.01); *G01N 2021/399* (2013.01)

(58) Field of Classification Search
CPC .. G01N 21/0303; G01N 21/276; G01N 21/39; G01N 2021/399; G01N 21/05; G01N 21/3504; G01N 2201/0668

USPC ......................................................... 356/437
See application file for complete search history.

(56) References Cited

U.S. PATENT DOCUMENTS

| | | | | |
|---|---|---|---|---|
| 8,836,853 B2 * | 9/2014 | Shinohara | .............. | G03B 17/02 348/373 |
| 2009/0103852 A1 | 4/2009 | Hamamoto | | |
| 2019/0101487 A1 | 4/2019 | Shibuya et al. | | |

FOREIGN PATENT DOCUMENTS

| | | |
|---|---|---|
| JP | 5444711 B2 | 3/2014 |
| JP | 2018-088456 A | 6/2018 |
| JP | 2019-066475 A | 4/2019 |
| JP | 2019-110164 A | 7/2019 |
| JP | 2019-120665 A | 7/2019 |
| JP | 2019-197933 A | 11/2019 |

* cited by examiner

*Primary Examiner* — Md M Rahman
(74) *Attorney, Agent, or Firm* — Oblon, McClelland, Maier & Neustadt, L.L.P.

(57) ABSTRACT

According to one embodiment, a gas analysis device includes: a base including a concave portion; a window includes a first film and a second film; an optical part that is located at a side of the window opposite to the base side and includes a light projector and a light receiver; and an optical path length controller that is located between the base and the window and has a controllable thickness. The concave portion includes a first sidewall that is oblique to a surface of the base, and a second sidewall that is oblique to the surface of the base. An oblique direction of the second sidewall is opposite to an oblique direction of the first sidewall. The light projector is configured to irradiate light toward the first sidewall. The light receiver is configured to convert light reflected by the second sidewall.

20 Claims, 4 Drawing Sheets

GAS ANALYSIS DEVICE

CROSS-REFERENCE TO RELATED APPLICATIONS

This application is based upon and claims the benefit of priority from Japanese Patent Application No. 2020-138661, filed on Aug. 19, 2020; the entire contents of which are incorporated herein by reference.

FIELD

Embodiments described herein relate generally to a gas analysis device.

BACKGROUND

There is a gas analysis device that irradiates light on a sample gas and performs an analysis by utilizing the absorption by the sample gas of a portion of the energy of the irradiated light. Such a gas analysis device may include a so-called multi-reflection cell. The multi-reflection cell includes a pair of opposing mirrors and multiply reflects the light that is introduced between the pair of mirrors. By providing the pair of mirrors, the optical path length can be lengthened; therefore, the distance that the introduced light acts on the sample gas can be lengthened. Therefore, the accuracy of the analysis can be increased.

However, when the pair of mirrors are simply arranged to face each other, the structure of the gas analysis device becomes complex, and downsizing is difficult. The accuracy of the analysis can be further increased if the light can resonate between the pair of mirrors. However, in order for the light to resonate, it is necessary to set the optical path length to an integer multiple of the wavelength. Therefore, it is necessary to perform nanometer-order adjustment of the distance between the pair of mirrors; and the adjustment of the optical path length is difficult.

Therefore, it is desirable to develop a more compact gas analysis device in which the optical path length is easy to adjust.

DETAILED DESCRIPTION

Figure 1:
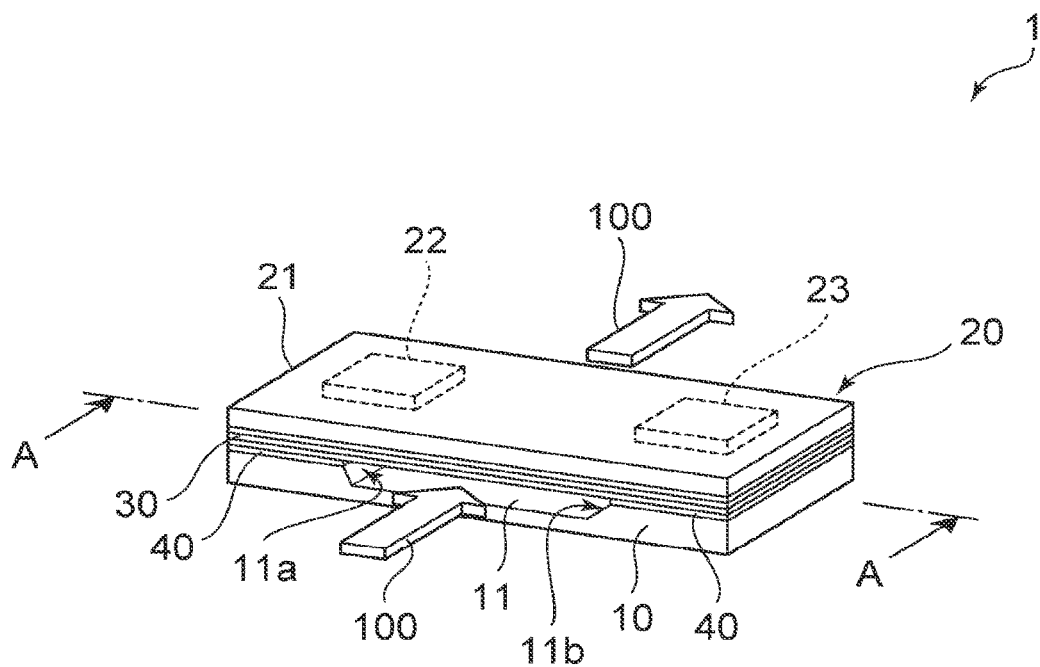
FIG. 1 is a schematic perspective view for illustrating a gas analysis device according to an embodiment.

In general, according to one embodiment, a gas analysis device includes: a base having a plate shape and including a concave portion open at one surface of the base; a window that is located at a side of the base at which the concave portion is open, and includes a first film, and a second film that is stacked with the first film and has a different refractive index than the first film; an optical part that is located at a side of the window opposite to the base side and includes a light projector and a light receiver; and an optical path length controller that is located between the base and the window and has a controllable thickness. The concave portion includes a first sidewall that is oblique to a surface of the base at which the concave portion is open, and a second sidewall that faces the first sidewall and is oblique to the surface at which the concave portion is open. An oblique direction of the second sidewall is opposite to an oblique direction of the first sidewall. The light projector is configured to irradiate light toward the first sidewall. The light receiver is configured to convert light reflected by the second sidewall into an electrical signal.

Exemplary embodiments will now be described with reference to the drawings. Similar components in the drawings are marked with like reference numerals.

FIG. 1 is a schematic perspective view for illustrating a gas analysis device 1 according to an embodiment.

Figure 2:
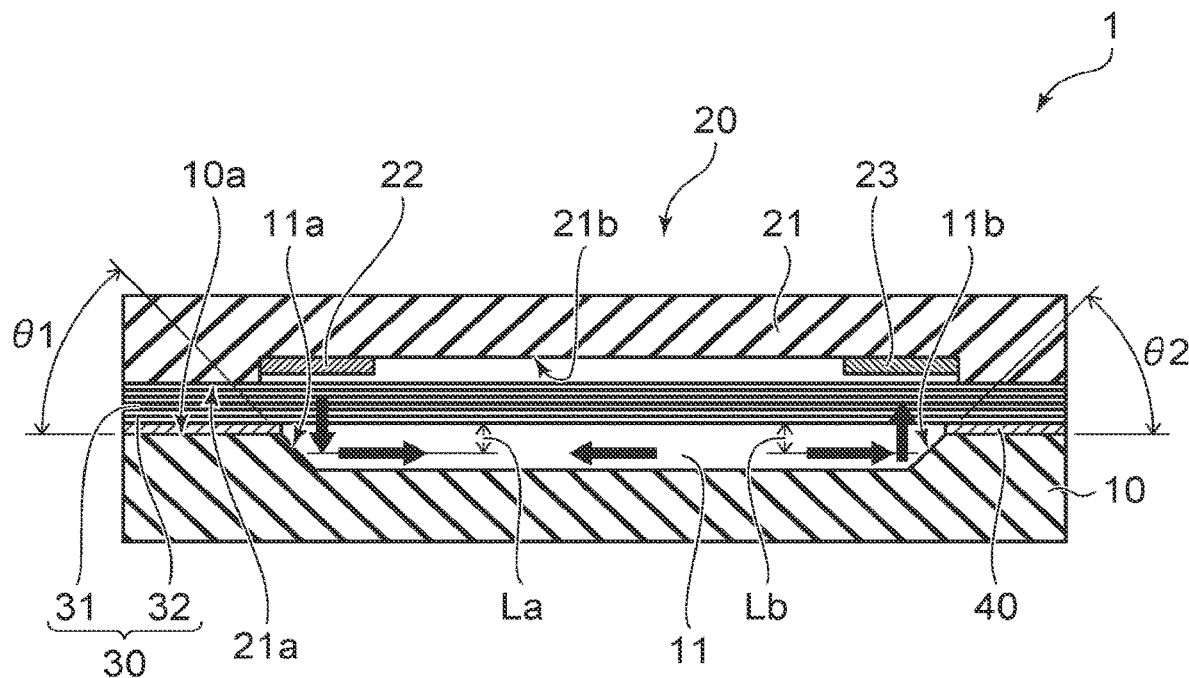
FIG. 2 is a schematic cross-sectional view along line A-A of the gas analysis device of FIG. 1.

FIG. 2 is a schematic cross-sectional view along line A-A of the gas analysis device 1 of FIG. 1.

As shown in FIGS. 1 and 2, the gas analysis device 1 may include a base 10, an optical part 20, a window 30, and an optical path length controller 40.

The base 10 has a plate shape and includes a concave portion 11 that is open at one end surface 10a. The internal space of the concave portion 11 is a cavity to which a gas (a sample gas) 100 that is an object of an analysis is introduced. The concave portion 11 also can be open at mutually-facing side surfaces of the base 10. The opening at one side surface of the base 10 can be used as an inlet to which the gas 100 is introduced. The other opening of the base 10 can be used as an outlet from which the gas 100 is exhausted when the gas 100 has been analyzed. Also, not-illustrated lids that cover the inlet and the outlet can be provided. Joints for connecting piping, etc., can be provided as appropriate in the lids.

As shown in FIG. 1, the planar shape of the base 10 can be rectangular. As described below, the region between one sidewall 11a (corresponding to an example of a first sidewall) of the concave portion 11 and a sidewall 11b (corresponding to an example of a second sidewall) of the concave portion 11 that faces the sidewall 11a is used as an optical path. In such a case, the distance along which the light acts on the gas 100 can be lengthened by increasing the distance between the sidewall 11a and the sidewall 11b. Therefore, if the distance between the sidewall 11a and the sidewall 11b can be increased, the accuracy of the analysis can be increased because the energy of the light is easily absorbed by the gas 100. For example, as shown in FIG. 1, it is favorable for the planar shape of the base 10 to be rectangular.

As shown in FIG. 2, the one sidewall 11a of the concave portion 11 and the sidewall 11b of the concave portion 11 that faces the sidewall 11a can be oblique surfaces. The sidewall 11a is oblique to a surface 10a of the base 10 at which the concave portion 11 is open. An oblique angle $\theta1$ of the sidewall 11a (the angle of the sidewall 11a with respect to the end surface 10a) can be, for example, 45°. The sidewall 11b faces the sidewall 11a and is oblique to the surface 10a at which the concave portion 11 is open. An oblique angle $\theta2$ of the sidewall 11b (the angle of the sidewall 11b with respect to the end surface 10a) can be, for example, 45°. In such a case, the oblique direction of the sidewall 11b can be opposite to the oblique direction of the sidewall 11a.

The material of the base 10 is not particularly limited as long as the material is somewhat rigid and is somewhat resistant to the gas 100. For example, the base 10 can be formed from an inorganic material such as silicon, a ceramic, or the like, a metal such as aluminum, stainless steel, or the like, a resin such as a fluorocarbon resin, etc.

In such a case, if the material of the base 10 is silicon, for example, the base 10 can be formed by patterning a silicon wafer by using anisotropic etching which is a semiconductor manufacturing process. Therefore, the precision of the oblique angle θ1 of the sidewall 11a, the oblique angle θ2 of the sidewall 11b, the dimensions of the concave portion 11, etc., can be increased.

As described below, the sidewalls 11a and 11b are used as reflecting surfaces of light. Therefore, to increase the reflectances, it is favorable for the sidewalls 11a and 11b to be flat surfaces. For example, if the material of the base 10 is silicon and the sidewalls 11a and 11b are formed using anisotropic etching which is a semiconductor manufacturing process, it is easy to form the sidewalls 11a and 11b as flat surfaces.

Also, reflective films can be provided at the front surfaces of the sidewalls 11a and 11b. The reflective films can include, for example, a metal such as gold or the like, a dielectric material such as $SiO_2$, etc. By providing the reflective films, the accuracy and sensitivity of the analysis can be increased because the energy of the light absorbed by the sidewalls 11a and 11b can be reduced.

The optical part 20 is located at the side of the window 30 opposite to the base 10 side.

The optical part 20 can include a holder 21, a light projector 22, and a light receiver 23.

The holder 21 can have a plate shape and can include a concave portion 21b that is open at one end surface 21a. For example, the planar shape and planar dimensions of the holder 21 can be the same as the planar shape and planar dimensions of the base 10.

The light projector 22 and the light receiver 23 can be located in the interior of the concave portion 21b. For example, the light projector 22 and the light receiver 23 can be located at the bottom surface of the concave portion 21b. In such a case, the light projector 22 can be located at a position that faces the sidewall 11a. The light receiver 23 can be located at a position that faces the sidewall 11b.

By providing the light projector 22 and the light receiver 23 in the interior of the concave portion 21b, external light (ambient light) that is irradiated into the interior of the concave portion 11 of the base 10 and external light (ambient light) that is incident on the light receiver 23 can be suppressed. In other words, the holder 21 can have the function of holding the light projector 22 and the light receiver 23 and the function of covering the light projector 22 and the light receiver 23.

The material of the holder 21 is not particularly limited as long as the material is somewhat rigid. However, as described above, considering the function of the holder 21 covering the light projector 22 and the light receiver 23, it is favorable for the material of the holder 21 not to transmit light easily. For example, the holder 21 can be formed from an inorganic material such as silicon, a ceramic, or the like, a metal such as aluminum, stainless steel, or the like, a resin such as a fluorocarbon resin, etc.

The light projector 22 irradiates light on the sidewall 11a. The light projector 22 can be a light-emitting element that emits light of a prescribed wavelength. The light projector 22 irradiates the light on the sidewall 11a via the window 30. Here, light of the mid-infrared region (light of a wavelength that is not less than 4 μm and not more than 16 μm) matches an intense absorption line originating in the fundamental vibration of molecules, and therefore is advantageous in the analysis of a trace gas. Therefore, it is favorable for the light projector 22 to be an element that emits light of the mid-infrared region. For example, a quantum cascade laser (QCL) element is an example of an element that emits light of the mid-infrared region.

The absorption wavelengths of the molecules are different according to the component of the gas 100. For example, the absorption wavelength is about 4.5 μm for CO, $CO_2$, etc. For example, the absorption wavelength is about 9 μm or about 10 for $NH_3$, etc.

Therefore, it is favorable for the light projector 22 to be able to change the oscillation wavelength according to the predicted component of the gas 100. In such a case, the quantum cascade laser element can change the oscillation wavelength by controlling the voltage (or the current) that is applied. Therefore, if the light projector 22 is a quantum cascade laser element, the oscillation wavelength can be changed according to the predicted component of the gas 100 to exactly match the absorption line; therefore, the accuracy of the analysis can be increased. Also, ppb-level trace detection, etc., are possible because the wavelength resolution can be increased.

The light receiver 23 converts the light that is reflected by the sidewall 11b and emitted from the concave portion 11 via the window 30 into an electrical signal. As described above, it is favorable for light of the mid-infrared region to be used to analyze the gas 100. Therefore, it is favorable for the light receiver 23 to be suited to detecting light of the mid-infrared region. The light receiver 23 can be, for example, a quantum photoelectric element. The quantum photoelectric element can include, for example, one of InGaAs, PbSe, InAs, InSb, or MCT (HgCdTe (mercury cadmium telluride)).

A PC-QCL (Photonic Crystal-Quantum Cascade Laser) element is one type of quantum cascade laser element. A PC-QCL element is a quantum cascade laser element that is of the surface-emitting type. A PC-QCL element includes a photonic crystal and can emit light of the mid-infrared region from the front surface of the element when a voltage (or a current) is applied. A normal QCL uses the cleavage plane of the semiconductor crystal as a resonator mirror and therefore emits light from the cleaved end surface. A configuration such as that of the invention is only possible when the laser light is obtained from the front surface. Also, light of the mid-infrared region can be detected if a PC-QCL element is used. When a conventional QCL is used to detect the light, it is necessary for the light to enter the waveguide structure, i.e., the resonator, and it is not easy for the light to be introduced to the waveguide because the waveguide is extremely narrow, i.e., several μm. According to the structure of the invention, however, the light that is detected is introduced to the element front surface at which the PC is formed; therefore, the light is automatically introduced to the waveguide by the PC. Therefore, the light receiver 23 also can be a PC-QCL element.

As shown in FIG. 2, the light projector 22 emits light of the mid-infrared region toward the window 30. A portion of the light that is incident on the window 30 passes through the window 30 and is incident on the sidewall 11a. The light that is incident on the sidewall 11a is reflected by the sidewall 11a and is incident on the sidewall 11b. The light that is incident on the sidewall 11b is reflected by the sidewall 11b and is incident on the window 30. A portion of the light that is incident on the window 30 passes through the window 30 and is incident on the light receiver 23. Also, a portion of the light that is incident on the window 30 is reflected by the window 30 and travels via the sidewall 11b and the sidewall 11a to be incident on a portion of the window 30 that faces the light projector 22. Therefore, a traveling wave and a reflected wave interfere in the optical path described above to generate a standing wave.

Thus, the window 30 has the function of transmitting a portion of the light of the mid-infrared region that is incident and the function of reflecting a portion of the light of the mid-infrared region that is incident. In such a case, if the reflectance is too low, it is necessary for the light receiver 23 to have high temporal resolution because the decay time of the reflected wave is short. On the other hand, if the reflectance is too high, it is necessary for the light receiver 23 to have high sensitivity because the light amount of the light that is incident on the light receiver 23 is low. Also, it is necessary for the light projector 22 to have a high output because the light amount of the light that is incident on the sidewall 11a via the window 30 is low.

According to knowledge obtained by the inventor, it is favorable for the reflectance of the window 30 for light of the mid-infrared region to be not less than 99% but less than 100%. In such a case, if the concentration of the component (the measurement object) included in the gas 100 is low, it is favorable for the reflectance to be high to reduce the light amount of the light emitted from the interior of the concave portion 11.

In other words, it is favorable for the reflectance of the window 30 for light of the mid-infrared region to be not less than 99%, and it is favorable for the reflectance of the window 30 to be adjustable according to the concentration of the component.

Therefore, the window 30 according to the embodiment can be a stacked film in which multiple types of films that have different refractive indexes for light of the mid-infrared region are stacked. For example, as shown in FIG. 2, the window 30 can be located at the side of the base 10 at which the concave portion 11 is open, and can be a stacked film in which a first film 31 and a second film 32 that has a different refractive index than the first film 31 are stacked.

For example, when the wavelength of the light is 4.5 μm, the material of the first film 31 can be ZnSe; and the thickness of the first film 31 can be set to 473 nm. The material of the second film 32 can be ZnS; and the thickness of the second film 32 can be set to 511 nm. The number of the first films 31 and the number of the second films 32 each can be about 30.

For example, when the wavelength of the light is 4.5 μm, the material of the first film 31 can be ZnSe; and the thickness of the first film 31 can be set to 473 nm. The material of the second film 32 can be Ge; and the thickness of the second film 32 can be set to 286 nm. The number of the first films 31 and the number of the second films 32 each can be about 20.

For example, when the wavelength of the light is 4.5 μm, the material of the first film 31 can be Si; and the thickness of the first film 31 can be set to 328 nm. The material of the second film 32 can be Ge; and the thickness of the second film 32 can be set to 286 nm. The number of the first films 31 and the number of the second films 32 each can be about 25.

The first film 31 and the second film 32 are not limited to those illustrated. For example, it is sufficient to combine multiple types of films that have different refractive indexes and transmit light of the mid-infrared region, and for the optical thickness of each film to be ¼ of the wavelength.

In other words, by using the window 30 according to the embodiment, a reflectance that is suited to the concentration of the component can be obtained by selecting at least one of the material (the refractive index), the thickness, or the number of stacks of the films.

Here, as described above, a standing wave is formed in the interior of the concave portion 11 of the gas analysis device 1 according to the embodiment. In such a case, the intensity of the standing wave can be increased by resonance if the optical path length is an integer multiple of the wavelength of the light. Therefore, the arrangement of the sidewalls 11a and 11b can be determined so that the optical path length is an integer multiple of the wavelength of the light. However, the dimensions, shapes, arrangement, etc., of the sidewalls 11a and 11b include manufacturing fluctuation; therefore, it is difficult to set the optical path length to be an integer multiple of the wavelength of the light. Also, as described above, there are cases where the oscillation wavelength is modified according to the predicted component of the gas 100. Then, there are also cases where it is necessary to modify the optical path length according to the oscillation wavelength.

In a general gas analysis device, the optical path length is set to be an integer multiple of the wavelength of the light by adjusting the distance between the pair of reflecting surfaces. However, the adjustment amount is a nanometer-order adjustment amount because the wavelength is about several μm. Therefore, it is difficult to set the optical path length to be an integer multiple of the wavelength of the light by adjusting the distance between the pair of reflecting surfaces.

Therefore, the gas analysis device 1 according to the embodiment includes the optical path length controller 40.

As shown in FIGS. 1 and 2, the optical path length controller 40 can be located between the base 10 and the window 30. The optical path length controller 40 can have a controllable thickness. For example, the optical path length controller 40 can be a piezoelectric element.

If the optical path length controller 40 is a piezoelectric element, the thickness of the optical path length controller 40 can be adjusted by controlling the voltage applied to the optical path length controller 40, that is, a distance La between the window 30 and the incident position of the light or the reflection position of the light of the sidewall 11a can be adjusted, and a distance Lb between the window 30 and the incident position of the light or the reflection position of the light of the sidewall 11b can be adjusted. In such a case, the adjustment amounts of the distances La and Lb may be the same or may be different from each other.

If the distance La and the distance Lb can be changed, the optical path length can be controlled. In such a case, if the optical path length controller 40 is a piezoelectric element, the optical path length can be controlled by controlling the voltage applied to the optical path length controller 40. Therefore, the control of the optical path length can be easy. Also, a nanometer-order adjustment is possible.

Effects of the gas analysis device 1 according to the embodiment will now be described.

First, the gas 100 is introduced to the interior of the concave portion 11 from a gas source, etc.

Then, for example, the light projector 22 irradiates light of the mid-infrared region into the interior of the concave portion 11 via the window 30. As described above, a standing wave is formed in the interior of the concave portion 11 when the light is irradiated into the interior of the concave portion 11. Molecule vibration, rotation, etc., are excited when the molecules that are included in the gas 100 are irradiated with the light and absorb the energy of the light. Therefore, the light intensity is reduced.

Due to the window 30, the light that is emitted from the light projector forms a standing wave between the window 30, the sidewalls 11a and 11b, and the window 30; and the decay time of the light intensity changes according to the concentration of the gas. The decay time changes between when a gas that does not absorb the mid-infrared region is introduced and when a gas that does absorb the mid-infrared region is introduced. A highly accurate concentration measurement also is possible by preparing several concentrations of the gas and by generating a calibration curve.

The gas 100 for which the measurement has ended can be exhausted out of the interior of the concave portion 11.

As described above, the gas analysis device 1 according to the embodiment can be a stack of the base 10 and the optical part 20 that have plate shapes, and the window 30 and the optical path length controller 40 that have film shapes. Therefore, downsizing of the gas analysis device 1 is easy.

The adjustment of the optical path length can be easily performed by electrically controlling the optical path length controller 40. In such a case, downsizing and/or a lower cost of the gas analysis device 1 also can be realized because it is unnecessary to provide a mechanical adjustment mechanism for adjusting the optical path length.

In other words, according to the gas analysis device 1 according to the embodiment, downsizing can be realized, and the adjustment of the optical path length can be easy.

A window 30a according to another embodiment will now be described.

Figure 3:
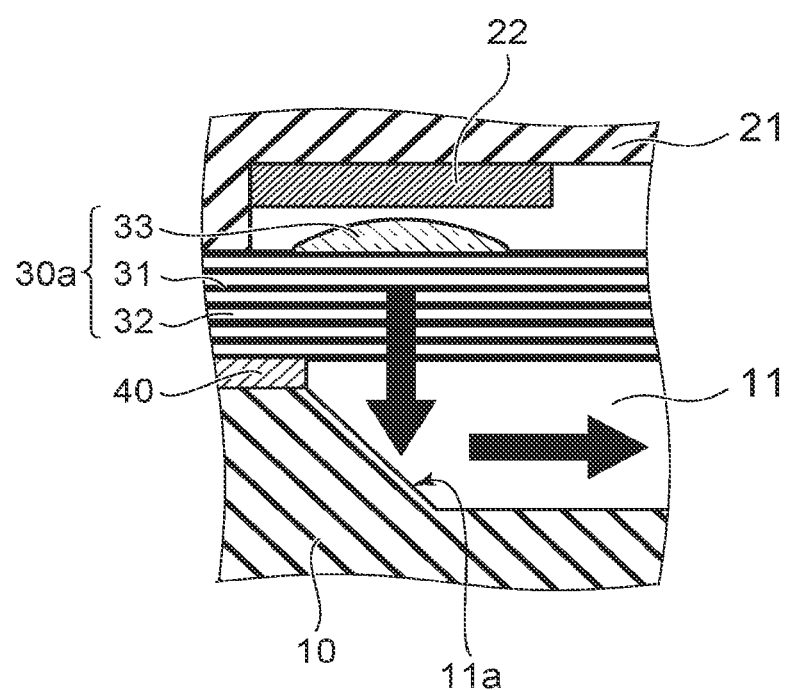
FIG. 3 is a schematic cross-sectional view for illustrating a window according to another embodiment.

FIG. 3 is a schematic cross-sectional view for illustrating the window 30a according to the other embodiment.

As shown in FIG. 3, the window 30a can include the first film 31, the second film 32, and an optical component 33. For example, the window 30a can be the window 30 described above that further includes the optical component 33.

For example, the optical component 33 can be located at the surface of the stacked film including the first and second films 31 and 32 at the side opposite to the base 10 side. The optical component 33 can be located between the light projector 22 and the sidewall 11a of the concave portion 11. By providing the optical component 33 at such a position, the light that is emitted from the light projector 22 is incident on the sidewall 11a via the optical component 33 and the stacked film.

In such a case, it is favorable for the optical component 33 to condense the light. For example, as shown in FIG. 3, the optical component 33 can be a convex lens. If the optical component 33 condenses the light, the intensity of the light that is incident on the sidewall 11a can be increased, and the incident position can be narrowed. Therefore, the accuracy of the analysis can be increased.

Although the optical component 33 is provided between the light projector 22 and the sidewall 11a of the concave portion 11 in the example of FIG. 3, the optical component 33 also can be provided between the light receiver 23 and the sidewall 11b of the concave portion 11. By providing the optical component 33 at such a position, the light that is reflected by the sidewall 11b is incident on the light receiver 23 via the optical component 33 and the stacked film.

In such a case, if the optical component 33 is a convex lens or the like that condenses the light, the intensity of the light that is incident on the light receiver 23 can be increased. Therefore, the accuracy of the analysis can be increased.

The optical component 33 can be provided between the light projector 22 and the sidewall 11a of the concave portion 11 and/or between the light receiver 23 and the sidewall 11b of the concave portion 11. In such a case, the accuracy of the analysis can be further increased if the optical component 33 is provided between the light projector 22 and the sidewall 11a of the concave portion 11 and between the light receiver 23 and the sidewall 11b of the concave portion 11.

Figure 4A:
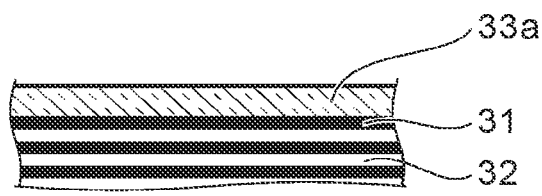
FIGS. 4A to 4C are schematic cross-sectional views of processes for illustrating a method for forming an optical component 33.
Figure 4B:
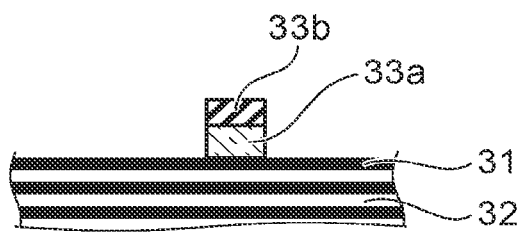
Figure 4C:
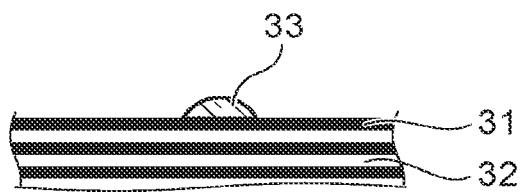

FIGS. 4A to 4C are schematic cross-sectional views of processes for illustrating a method for forming the optical component 33.

First, as shown in FIG. 4A, a film 33a for forming the optical component 33 is formed on the stacked film that includes the first and second films 31 and 32. For example, the film 33a can be formed from $SiO_2$ doped with phosphorus and boron, etc.

Then, a mask 33b is formed on the film 33a. The mask 33b can be, for example, a resist mask. For example, the mask 33b can be formed using photolithography.

Continuing as shown in FIG. 4B, the film 33a is etched using the mask 33b as an etching mask. The etching can be, for example, dry etching such as RIE (Reactive Ion Etching), etc.

Then, the mask 33b is removed. For example, the mask 33b can be removed by dry ashing, wet ashing, etc.

Continuing as shown in FIG. 4C, the optical component 33 is formed from the film 33a that is patterned into a prescribed shape. For example, the optical component 33 that includes a convex curved surface can be formed by heating the film 33a that is patterned into the prescribed shape. For example, the heating can be performed using a reflow furnace, etc. The heating temperature can be, for example, about 300° C. to 600° C.

In FIG. 4B, the film 33a is removed until the stacked film is exposed; however, the stacked film may not be exposed. In such a case, the shape (the curvature) of the convex curved surface can be changed by changing the height of the portion of the film 33a that becomes the optical component 33. Although the film 33a remains at the periphery of the optical component 33, the light is not incident on the film 33a at the periphery of the optical component 33. Therefore, there is little risk of the optical characteristics degrading due to the film 33a remaining at the periphery of the optical component 33.

An optical part 20a according to another embodiment will now be described.

Figure 5:
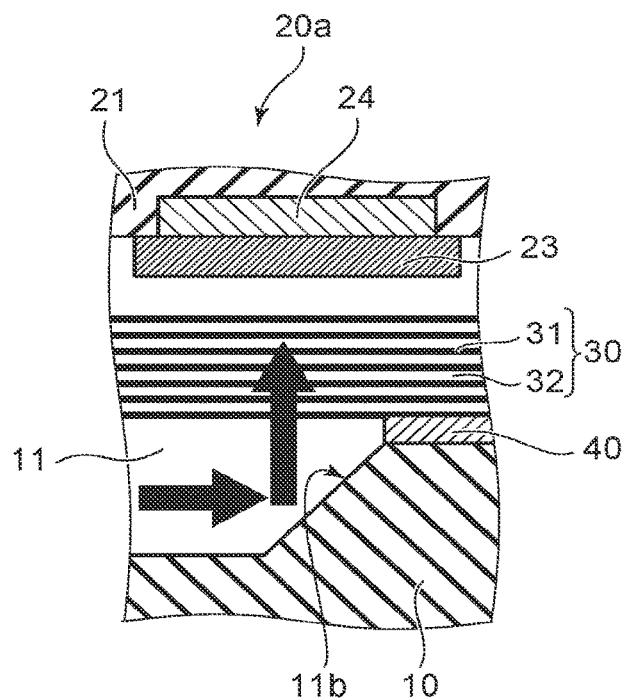
FIG. 5 is a schematic cross-sectional view for illustrating an optical part according to another embodiment.

FIG. 5 is a schematic cross-sectional view for illustrating the optical part 20a according to the other embodiment.

The optical part 20a can include the holder 21, the light projector 22, the light receiver 23, and a cooling part 24. For example, the optical part 20a can be the optical part 20 described above that further includes the cooling part 24.

For example, as shown in FIG. 5, the cooling part 24 can be provided at the surface of the light receiver 23 at the side opposite to the light incident side. Although the cooling part 24 is not particularly limited as long as the cooling part 24 has a cooling function, it is favorable for the cooling part 24 to be a Peltier element, etc., when considering the size, weight, controllability, etc.

When the light receiver 23 is a quantum photoelectric element, there is a risk that the noise may increase as the temperature increases. Therefore, it is favorable to reduce the temperature of the light receiver 23 as much as possible. By providing the cooling part 24, the temperature of the light receiver 23 can be reduced; therefore, the noise can be reduced, and the accuracy of the analysis can be increased.

When the light projector 22 is a quantum cascade laser element, there is a risk that the wavelength may fluctuate as the temperature changes. Therefore, it is favorable for the temperature of the light projector 22 to be as constant as possible. Therefore, the cooling part 24 can be provided also at the surface of the light projector 22 at the side opposite to the light emission side. By providing the cooling part 24, the temperature of the light projector 22 can be substantially constant; therefore, the wavelength of the light that is emitted can be stable, and the accuracy of the analysis can be increased. For example, a Peltier element can be provided as the cooling part 24, and the current that is caused to flow in the Peltier element can be controlled based on the temperature of the light projector 22 detected by a thermocouple, etc.

The cooling part 24 can be provided at at least one of the light receiver 23 or the light projector 22. In such a case, the accuracy of the analysis can be further increased by providing the cooling part 24 at the light receiver 23 and the light projector 22.

A gas analysis device 1a according to another embodiment will now be described.

Figure 6:
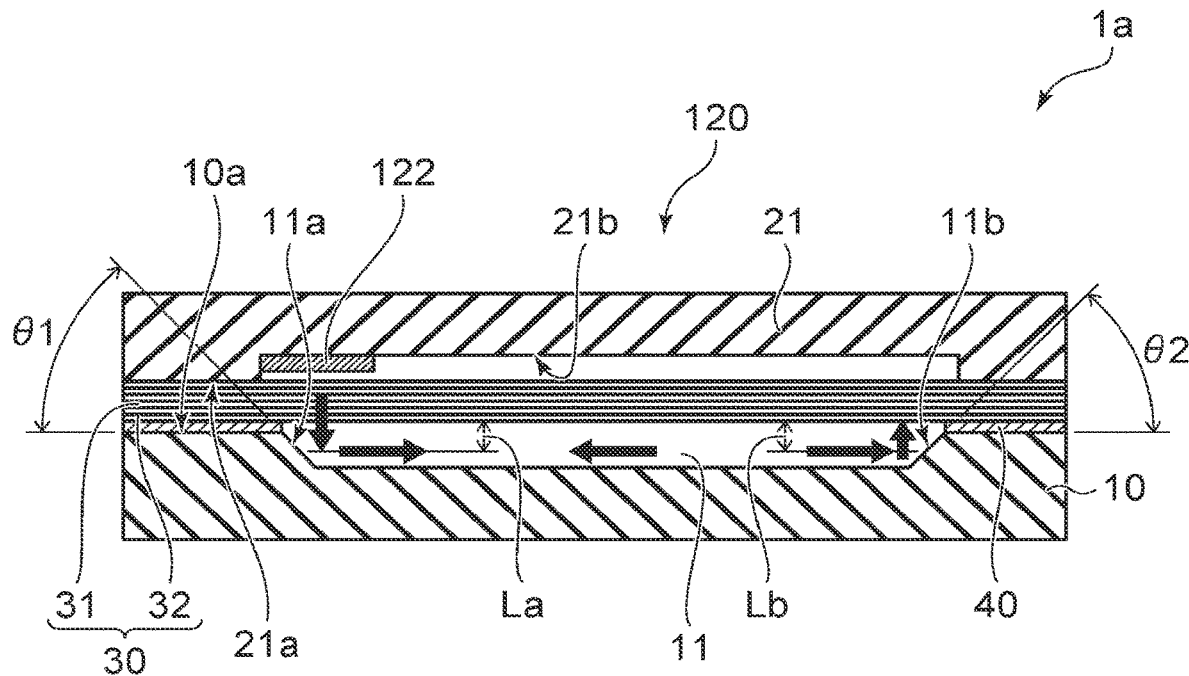
FIG. 6 is a schematic cross-sectional view for illustrating a gas analysis device according to another embodiment.

FIG. 6 is a schematic cross-sectional view for illustrating the gas analysis device 1a according to the other embodiment.

As shown in FIG. 6, the gas analysis device 1 can include the base 10, an optical part 120, the window 30, and the optical path length controller 40.

The optical part 120 can include the holder 21 and a light projector/receiver 122. In other words, the optical part 120 includes the light projector/receiver 122 that is located at the side of the window 30 opposite to the base 10 side.

The light projector/receiver 122 can be located in the interior of the concave portion 21b. For example, the light projector/receiver 122 can be located at the bottom surface of the concave portion 21b. In such a case, the light projector/receiver 122 can be located at a position that faces the sidewall 11a.

For example, the light projector/receiver 122 can emit light when a voltage or a current is applied, and can generate a voltage or a current according to the intensity of light that is incident in a state in which a voltage or a current is not applied. In other words, the light projector/receiver 122 is configured to irradiate light on the sidewall 11a, and can convert the reflected light from the sidewall 11a into an electrical signal after the irradiation of the light is stopped.

The light projector/receiver 122 can be, for example, a PC-QCL element. For example, light of the mid-infrared region can be emitted from the PC-QCL element into the interior of the concave portion 11 by applying a voltage or a current to the PC-QCL element. Then, when the application of the voltage or the current is stopped, an electrical signal can be output according to the intensity of the light incident on the PC-QCL element from the interior of the concave portion 11. Therefore, the component of the gas 100 can be analyzed based on the output electrical signal. For example, the component of the gas can be analyzed by starting a measurement when stopping the application of the voltage or the current and by measuring the decay time of the light in the interior of the concave portion 11.

According to the gas analysis device 1a according to the embodiment, a simplified configuration can be realized. Also, the component of the gas 100 can be analyzed by switching between applying and stopping the application of the voltage or the current to the PC-QCL element. Therefore, a simplified control circuit, a simplified control program, etc., can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A gas analysis device, comprising:
   a base having a plate shape, and including a concave portion open at one surface of the base;
   a window located at a side of the base at which the concave portion is open, the window including a first film and a second film stacked with each other, the second film having a different refractive index than the first film;
   an optical part located at a side of the window opposite to the base side, the optical part including a light projector and a light receiver; and
   an optical path length controller located between the base and the window, a thickness of the optical path length controller being controllable,
   the concave portion including
      a first sidewall oblique to a surface of the base at which the concave portion is open, and
      a second sidewall facing the first sidewall, the second sidewall being oblique to the surface at which the concave portion is open,
   an oblique direction of the second sidewall being opposite to an oblique direction of the first sidewall,
   the light projector being configured to irradiate light toward the first sidewall,
   the light receiver being configured to convert light reflected by the second sidewall into an electrical signal.

2. The device according to claim 1, wherein the light projector is a quantum cascade laser element.

3. The device according to claim 1, wherein the light receiver is
   a quantum photoelectric element, or
   a PC-QCL (Photonic Crystal-Quantum Cascade Laser) element including a quantum cascade laser element of a surface-emitting type.

4. The device according to claim 1, wherein a gas that is an object of an analysis can be introduced to an internal space of the concave portion.

5. The device according to claim 4, wherein the base further includes:
   an inlet introducing the gas to the internal space of the concave portion; and
   an outlet exhausting the gas from the internal space of the concave portion after the gas has been analyzed.

6. The device according to claim 1, wherein a planar shape of the base is a rectangular shape.

7. The device according to claim 6, wherein the first sidewall is located at one short side of the rectangular shape, and
   the second sidewall is located at an other short side of the rectangular shape.

8. The device according to claim 1, further comprising:
   a reflective film located at at least one of the first sidewall or the second sidewall.

9. The device according to claim 8, wherein
the reflective film includes at least one of a metal or a dielectric material.

10. The device according to claim 1, wherein
a reflectance of the window for light of a mid-infrared region being not less than 99%.

11. The device according to claim 1, further comprising:
an optical component located between the light projector and the first sidewall and/or between the light receiver and the second sidewall,
the optical component being configured to condense the light.

12. The device according to claim 1, further comprising:
a cooling part located at at least one of the light receiver or the light projector.

13. The device according to claim 1, wherein
the optical path length controller is a piezoelectric element.

14. A gas analysis device, comprising:
a base having a plate shape, and including a concave portion open at one surface of the base;
a window located at a side of the base at which the concave portion is open, the window including a first film and a second film stacked with each other, the second film having a different refractive index than the first film;
an optical part located at a side of the window opposite to the base side, the optical part including a light projector/receiver; and
an optical path length controller located between the base and the window, a thickness of the optical path length controller being controllable,
the concave portion including
a first sidewall oblique to a surface of the base at which the concave portion is open, and
a second sidewall facing the first sidewall, the second sidewall being oblique to the surface at which the concave portion is open,
an oblique direction of the second sidewall being opposite to an oblique direction of the first sidewall,
the light projector/receiver being configured to
irradiate light toward the first sidewall, and
convert reflected light from the first sidewall into an electrical signal after the irradiation of the light is stopped.

15. The device according to claim 14, wherein
the light projector/receiver is a PC-QCL (Photonic Crystal-Quantum Cascade Laser) element including a quantum cascade laser element of a surface-emitting type.

16. The device according to claim 15, wherein
the light projector/receiver is configured to:
irradiate light of a mid-infrared region toward the first sidewall when a voltage or a current is applied; and
output the electrical signal corresponding to an intensity of the reflected light from the first sidewall when the application of the voltage or the current is stopped.

17. The device according to claim 14, wherein
a gas that is an object of an analysis can be introduced to an internal space of the concave portion.

18. The device according to claim 14, wherein
a planar shape of the base is a rectangular shape.

19. The device according to claim 18, wherein
the first sidewall is located at one short side of the rectangular shape, and
the second sidewall is located at an other short side of the rectangular shape.

20. The device according to claim 14, wherein
the optical path length controller is a piezoelectric element.

* * * * *